(No Model.)

D. P. BURKETT, Dec'd.,
K. M. Burkett, Administratrix.
HAY AND COTTON PRESS.

No. 258,368. Patented May 23, 1882.

WITNESSES:
Thos. Houghton.
W. Read

INVENTOR:
David P. Burkett
BY
ATTORNEYS.

UNITED STATES PATENT OFFICE.

DAVID P. BURKETT, OF ELMO, ARKANSAS, ASSIGNOR OF ONE-THIRD TO ROBERT R. CASE, OF SAME PLACE; KEZIAH M. BURKETT, ADMINISTRATRIX OF DAVID P. BURKETT, DECEASED.

HAY AND COTTON PRESS.

SPECIFICATION forming part of Letters Patent No. 258,368, dated May 23, 1882.

Application filed January 26, 1882. (No model.)

*To all whom it may concern:*

Be it known that I, DAVID P. BURKETT, of Elmo, in the county of Independence and State of Arkansas, have invented a new and Improved Hay and Cotton Press; and I do hereby declare that the following is a full, clear, and exact description of the same, reference being had to the accompanying drawings, forming part of this specification, in which—

Figure 1:
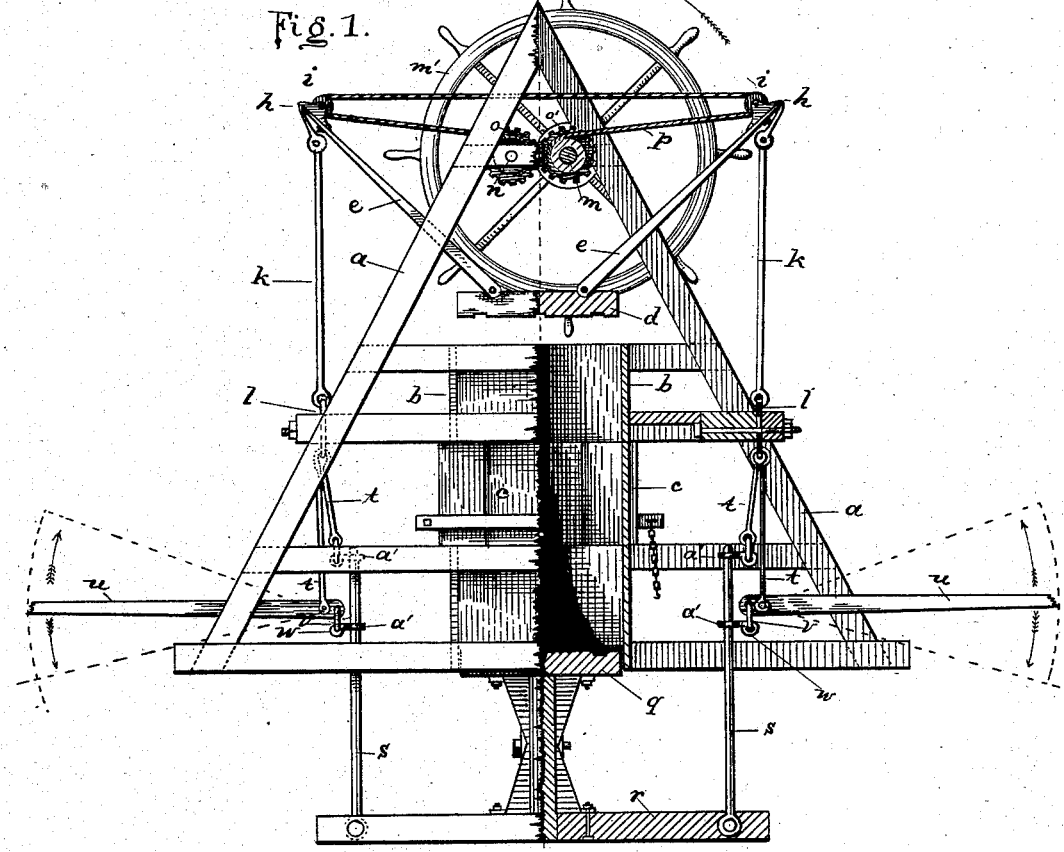
Figure 2:
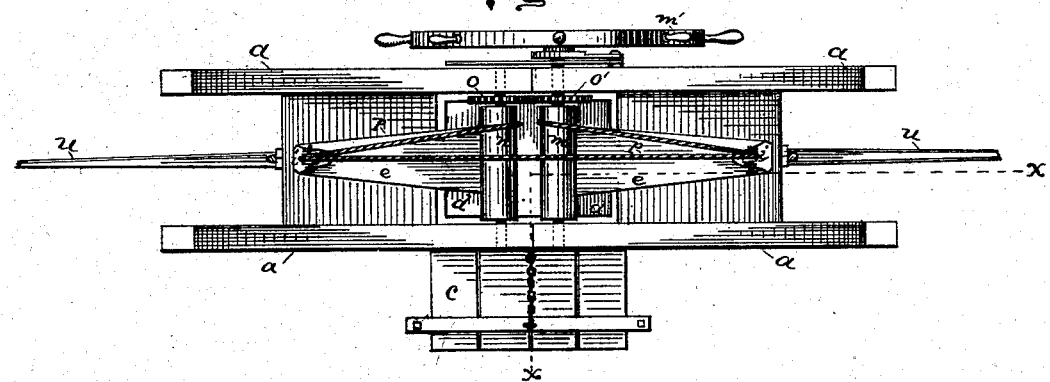

Figure 1 is a side elevation, partly in section, of my improved press, and Fig. 2 is a plan view of the same.

My invention relates to improvements in hay and cotton presses; and it consists in the peculiar construction and arrangement of the parts, as hereinafter more fully set forth.

In the accompanying drawings, $a$ represents the frame of my improved press, which I have represented of triangular form, which supports the press-box $b$, having opposite doors $c$ $c$ in the middle of two of its opposite sides. The press box $b$ is open at both ends.

$d$ represents the upper follower, adapted to fit closely in the box $b$.

To the upper face of the follower $d$, near its ends, are hinged the arms $e$, to outer ends of which are secured the hooks $h$, each provided with a pulley, $i$, near its upper end.

$k$ represents eyebolts, the eyes in the upper ends of which are inserted in the hooks $h$, the lower eyes of the eyebolts $k$ each engaging with a link, $l$, passing through a slot in one of the cross-bars of the frame.

$m$ represents a horizontal shaft having its bearings in the cross-bars of the frame $a$, and carrying a hand-wheel, $m'$, at one end and a ratchet and pawl.

$n$ represents a horizontal shaft parallel with the shaft $m$, and journaled in the cross-bars of the frame $a$, and provided with a cog-gear, $o$, which meshes with a cog-gear, $o'$, on the shaft $m$.

$p$ represents a wire rope, secured at one end to the shaft $m$, passing thence around the pulleys $i$, secured to hooks $h$, and attached at its opposite end to the other shaft, $n$, whereby the follower $d$ is operated downwardly in the press-box by turning the hand-wheel $m'$.

$q$ represents the lower follower, adapted to fit closely in the press-box, and supported on a sill, $r$, to the ends of which are secured the parallel vertical rods $s$ $s$. The sill $r$, supporting the lower follower, $q$, is suspended from the links $l$ $l$ by the fulcrum-irons $t$ $t$, provided with eyes at their upper ends, which engage with the links $l$ $l$.

$u$ $u$ represent levers fulcrumed near their inner ends in the lower ends of the fulcrum-irons $t$ $t$, and connected at their inner ends by links $v$, loosely connected with eyes $w$, secured to rings $a'$, which slide on the rods $s$. The upper rings, $a'$, (there being two or more on each rod $s$,) are similarly secured by loose connections with the fulcrum-irons $t$ $t$.

It will be seen from the above description that while the upper and lower followers are each operated by separate and independent mechanism both are connected with the links $l$ $l$, whereby the construction is simplified and a part of the mechanism employed to depress the upper follower. The links $l$ $l$ are also utilized from which to suspend the mechanism for operating the lower follower and counteract the strain upon it.

The operation of my improved press is as follows: The upper follower having been raised out of the press-box and the sill of the lower follower lowered into a pit made in the ground under the frame for the purpose until the lower follower is flush with the lower end of the box, the cotton or other material to be pressed into a bale is introduced into the upper end of the box and pressed in by the feet of the operators until no more material can be introduced into the box. The upper follower is then introduced into the box and the hand-wheel operated, forcing the upper follower downward to its full extent and pressing the upper part of the bale. Power is then applied to the levers $u$ $u$ and the lower follower raised, pressing the lower end of the bale. The doors in the opposite sides of the press-box are then opened and the bale, thoroughly pressed, removed from the box. It will be observed that the upper and lower followers are not simultaneously operated, but that the upper end of the bale is first pressed and then the lower, whereby all the power can first be brought to bear upon the upper follower and afterward upon the lower follower, and that less power would be required to operate the followers separately than simultaneously.

It will also be observed that in my construction and arrangement of the parts the strain upon the frame from the power is slight, so that the frame can be constructed of comparatively light material.

What I claim as my invention is—

1. In a press, the combination, with a box open at its ends and provided with doors in its opposite sides, of an upper descending follower, $d$, a lower ascending follower, $q$, and auxiliary mechanism operating separately and independently of the frame, substantially as described.

2. The combination, with the frame $a$, carrying the box $b$, open at its ends and provided with doors in its opposite sides, of the follower $d$, provided with the hinged arms $e$, hooks $h$, having pulleys $i$, eyebolts $k$, links $l$, shafts $m$ $n$, wire rope $p$ and hand-wheel $m'$, and sill $r$, provided with rods $s$, and follower $q$, fulcrumed irons $t\ t$, suspended from the links $l$, levers $u\ u$, and rings $a'$, substantially as described, and for the purpose set forth.

DAVID PARKS BURKETT.

Witnesses:
SOLON C. KEMON,
CHAS. A. PETTIT.